US011987087B2

(12) United States Patent
Andersson et al.

(10) Patent No.: US 11,987,087 B2
(45) Date of Patent: May 21, 2024

(54) LOAD SENSOR ARRANGEMENT FOR A VEHICLE AXLE

(71) Applicant: Volvo Truck Corporation, Gothenburg (SE)

(72) Inventors: Jörgen Andersson, Landvetter (SE); Emmanuel Bue, Villeurbanne (FR)

(73) Assignee: Volvo Truck Corporation, Gothenburg (SE)

( * ) Notice: Subject to any disclaimer, the term of this patent is extended or adjusted under 35 U.S.C. 154(b) by 509 days.

(21) Appl. No.: 16/628,847

(22) PCT Filed: Jun. 29, 2018

(86) PCT No.: PCT/EP2018/067646
§ 371 (c)(1),
(2) Date: Jan. 6, 2020

(87) PCT Pub. No.: WO2019/007847
PCT Pub. Date: Jan. 10, 2019

(65) Prior Publication Data
US 2021/0008940 A1   Jan. 14, 2021

(51) Int. Cl.
*B60G 17/019* (2006.01)
*B60G 11/113* (2006.01)
(Continued)

(52) U.S. Cl.
CPC .......... *B60G 11/113* (2013.01); *B60G 17/019* (2013.01); *G01G 19/08* (2013.01);
(Continued)

(58) Field of Classification Search
CPC ............ B60G 17/019; B60G 2204/116; B60G 2204/1162; B60G 2400/60;
(Continued)

(56) References Cited

U.S. PATENT DOCUMENTS

| 2,996,697 A | | 8/1961 | Ellis et al. | |
| 4,215,754 A | * | 8/1980 | Hagedorn | .............. G01G 19/12 177/137 |

(Continued)

FOREIGN PATENT DOCUMENTS

| CA | 2997457 A1 | * | 9/2018 | ......... A63C 17/0093 |
| CN | 1533336 A | * | 9/2004 | ............. B60G 11/27 |

(Continued)

OTHER PUBLICATIONS

International Search Report and Written Opinion for International Patent Application No. PCT/EP2018/067646, dated Oct. 4, 2018, 11 pages.

(Continued)

*Primary Examiner* — Barry Gooden, Jr.
(74) *Attorney, Agent, or Firm* — Withrow & Terranova, PLLC

(57) ABSTRACT

The invention relates to a load sensor arrangement (100) for installation on a vehicle axle (106) of a vehicle (108). The load sensor arrangement (100) comprises: a non-invasive load sensor (102) for measuring a load subjected to the vehicle axle (106) and a sensor holder (110). The sensor holder (110) comprises a sensor holding portion (112) and a mounting portion (114). The mounting portion (114) is adapted for attachment to the vehicle axle (106), and the sensor holding portion (112) is adapted for holding the load sensor (102) in a position for direct measuring on the vehicle axle (106). The load sensor arrangement (100) comprises an attachment element (118) for releasable connection of said load sensor (102) to said sensor holding portion (112). The invention further relates to a vehicle axle arrangement, a vehicle, a method of installing a non-invasive load sensor on a vehicle axle, and the use of a load sensor arrangement.

10 Claims, 13 Drawing Sheets

(51) Int. Cl.
*G01G 19/08* (2006.01)
*G01G 19/12* (2006.01)

(52) U.S. Cl.
CPC ........ *G01G 19/12* (2013.01); *B60G 2202/112* (2013.01); *B60G 2204/116* (2013.01); *B60G 2204/121* (2013.01); *B60G 2400/60* (2013.01); *B60G 2401/17* (2013.01)

(58) Field of Classification Search
CPC .......... B60G 2401/14; B60G 2401/172; B60G 2401/21; G01G 3/124; G01G 19/08; G01G 19/12; G01G 23/36; G01G 23/361
See application file for complete search history.

(56) References Cited

U.S. PATENT DOCUMENTS

| | | | | |
|---|---|---|---|---|
| 5,205,514 | A * | 4/1993 | Patzig | G01G 19/07 177/136 |
| 5,418,875 | A * | 5/1995 | Nakano | G02B 6/3897 385/88 |
| 5,681,998 | A | 10/1997 | Nakazaki et al. | |
| 6,025,563 | A * | 2/2000 | Lesesky | G01G 19/08 177/136 |
| 6,036,179 | A * | 3/2000 | Rensel | B60C 23/0483 340/447 |
| 6,122,979 | A * | 9/2000 | Tsuchie | G01G 19/12 73/862.622 |
| 6,590,168 | B2 * | 7/2003 | Kawaguchi | G01G 19/08 177/136 |
| 6,591,674 | B2 * | 7/2003 | Gehman | G01F 1/6845 73/204.22 |
| 7,453,262 | B2 * | 11/2008 | Kawasaki | G01P 1/026 324/207.25 |
| 7,637,459 | B2 * | 12/2009 | Mast | B64C 25/001 244/108 |
| 10,826,208 | B1 * | 11/2020 | Shotter | G01D 11/245 |
| 11,163,313 | B2 * | 11/2021 | Öhman | B60L 5/36 |
| 2001/0013432 | A1 | 8/2001 | Kawaguchi et al. | |
| 2008/0129026 | A1 * | 6/2008 | Gray | G01G 19/4142 324/207.13 |

FOREIGN PATENT DOCUMENTS

| | | | | |
|---|---|---|---|---|
| CN | 101094773 | A | | 12/2007 |
| CN | 101641577 | A | | 2/2010 |
| CN | 101656022 | A * | 2/2010 | |
| CN | 104819756 | A | | 8/2015 |
| CN | 108398175 | A * | 8/2018 | |
| DE | 102004045670 | B3 * | 2/2006 | ............. B60G 11/48 |
| DE | 102020208490 | A1 * | 1/2022 | |
| EP | 0895070 | A1 | | 2/1999 |
| GB | 2256718 | A | | 12/1992 |
| JP | 08304167 | A * | 11/1996 | ............. B63C 11/30 |
| WO | 9411219 | A1 | | 5/1994 |
| WO | WO-9924274 | A1 * | 5/1999 | ......... B60G 17/0165 |
| WO | WO-2004005748 | A1 * | 1/2004 | ....... B60G 17/01933 |
| WO | WO-2006018001 | A1 * | 2/2006 | ............. B60G 17/019 |
| WO | WO-2012075512 | A2 * | 6/2012 | ............. B63C 11/30 |

OTHER PUBLICATIONS

International Preliminary Report on Patentability for International Patent Application No. PCT/EP2018/067646, dated Oct. 15, 2019, 8 pages.
First Office Action for Chinese Patent Application No. 201880044347.2, dated Oct. 14, 2022, 21 pages.

* cited by examiner

LOAD SENSOR ARRANGEMENT FOR A VEHICLE AXLE

This application is a 35 USC 371 national phase filing of International Application No. PCT/EP2018/067646, filed Jun. 29, 2018, which claims priority to International Application No. PCT/EP2017/067070, filed Jul. 7, 2017, the disclosures of which are incorporated herein by reference in their entireties.

TECHNICAL FIELD

The invention relates to a load sensor arrangement for installation of a load sensor on a vehicle axle. The invention further relates to a method for installing a load sensor on a vehicle axle and to a use of a non-invasive load sensor for measuring a load subjected to a vehicle axle. The invention also relates to a vehicle axle arrangement and a vehicle.

Although the invention will be described with respect to a truck, the invention is not restricted to this particular vehicle, but may accordingly also be used in other heavy-duty vehicles such as buses, and construction equipment, e.g. wheel loaders, excavators, articulated haulers, etc.

BACKGROUND

Vehicles may be equipped with load sensors for measuring an axle load of the vehicle. The measured axle load may provide valuable information to the driver of the vehicle regarding the weight of a loaded cargo on the vehicle. For example, most vehicles are not allowed to carry load that exceeds a certain weight, both from a legal point of view and from limitations of the vehicle's loading capacity. The legal restrictions may relate to for example a maximum permissible weight that may be carried on some roads or bridges.

Although the vehicle load may be determined using external scales (i.e. place the vehicle on a scale), a more convenient way is provided by load sensor installed on weight carrying axles of the vehicle. Such load sensors may for example be strain gauge sensor or a piezoelectric sensor which both relate a measure a load in response to a physical deformation of the sensor itself.

U.S. Pat. No. 5,681,998 discloses a strain gauge sensor for measuring an axle load. The strain gauge sensor is arranged in a recess of a levelling plate. The levelling plate with the strain sensor inside is interposed between a leaf spring and the axle at which a load is to be measured. The strain gauge is welded to the levelling plate for firm mechanical fixation to the levelling plate.

However, the load sensing solution described in U.S. Pat. No. 5,681,998 requires that the strain gauge can be mounted between the axle and the leaf spring. This inevitably sets restraints on the axle and the leaf spring design since the strain gauge must be able to fit in the space between the axle and the leaf spring. Furthermore, replacing a damaged sensor is cumbersome and costly.

Accordingly, there is a need for a more versatile load sensing installation for a load sensor on a vehicle axle.

SUMMARY

An object of the invention is to provide a load sensor arrangement which can be arranged on a vehicle axle in a simple manner and/or without modifications of the vehicle axle.

According to a first aspect of the invention, the object is achieved by a load sensing arrangement according to claim 1.

According to the first aspect of the invention, there is provided a load sensor arrangement for installation on a vehicle axle of a vehicle. The load sensor arrangement comprises: a non-invasive load sensor for measuring a load subjected to the vehicle axle, a sensor holder comprising a sensor holding portion and a mounting portion, wherein the mounting portion is adapted for attachment to the vehicle axle, and the sensor holding portion is adapted for holding the load sensor in a position for direct measuring on the vehicle axle. The load sensor arrangement further comprises an attachment element for releasable connection of said load sensor to said sensor holding portion.

The load sensor is a non-invasive load sensor. By "non-invasive sensor" is meant that the sensor does not have to mechanically affect the vehicle axle for measuring the load. For example, the load sensor does not require physical contact with the vehicle axle. Hereby, reduced influence is made by the load sensor on the vehicle axle compare to invasive sensors such as strain gauges and piezoelectric sensor. In addition, with a non-invasive load sensor mounting of the load sensor for measuring the load is simplified since physical contact between the active parts of the sensor and the vehicle axle is not required.

According to its abstract, U.S. Pat. No. 2,996,697 A1 relates to load indicating devices mounted on load carriers such as trucks, trailers, and the like and more particularly to a device of this type which indicates when the carrier is loaded over the maximum licensed limit.

According to its abstract, EP 0 895 070 A1 relates to a structure for attaching a sensing element for measuring load on a vehicle to a slide plate can reduce the number of components and gives good detection sensitivity. Mounting holes are made at an angle of about 20° at both ends of an internal curved surface of the slide plate. Sensing elements each is secured in each the mounting holes. A wiring plate is placed centrally on a concave portion of the internal curved surface of said slide plate and is used to integrate lead wires from the sensing elements and extend them externally. The wiring plate and lead wires are moulded.

One example of a non-invasive load sensor is a magnetic sensor that measures a change in an inductive response from the vehicle axle by applying a magnetic field to the vehicle axle. The induced currents in the (electrically conductive) vehicle axle cause a magnetic field that may be measure by the magnetic sensor. Based on a relationship between the applied magnetic field and the induced magnetic field an axle load may be estimated.

Other examples of non-invasive sensor are for example vibrating wire sensors and metal foil gages, both well known per se.

Another example of a non-invasive load sensor is an optical sensor which may be a fiber Bragg grating sensor. Such optical sensor comprises a fiber with local changes in refractive index. The optical fiber is connected to a light source and depending on the strain in the fiber a specific wavelength is reflected. Fiber Bragg grating sensors are known per se. Other known optical sensor may be based on analysing positions of parallel markers on the axle using image analysis.

However, at present magnetic sensors are preferred.

The sensor holding portion is adapted for holding the load sensor in a position for direct measuring on the vehicle axle. Hence, the non-invasive load sensor is arranged to provide measurements relating to the vehicle axle.

Optionally, the sensor holding portion and the mounting portion may be provided in a single part, i.e. being an integral unit.

Alternatively, the sensor holding portion and the mounting portion may be provided as two separate parts that may be assembled together prior to, or after the mounting of the mounting portion between the vehicle axle and the spring.

The load sensor arrangement further comprises an attachment element for releasable connection of the load sensor to the sensor holding portion.

The non-invasive load sensor being held in a position for direct measurement on the vehicle axle is an arrangement which is generally less sensible to the exact positioning of the load sensor on the vehicle than previous load sensor arrangements. Accordingly, an attachment element for releasable connection of the load sensor to the sensor holding portion may be used. This facilitates mounting (and replacement) of the load sensor on the vehicle axle without causing any impact on the vehicle axis.

The releasable connection of the load sensor may provide a "quick connection" such that the load sensor may be mounted (and replaced) on the vehicle axle without the need for specialised equipment. The load sensor may be released from the sensor holder portion without having to remove the sensor holder from the vehicle axle. The mounting portion of the sensor holder may be maintained mounted to the vehicle axle when the load sensor is attached to or removed from the sensor holding portion of the sensor holder.

By the provision of a load sensor arrangement as described in the above, the advantage of simple mounting of a load sensor and replacement of the load sensor without the need for removing the mounting portion from the vehicle axle is provided. Further, the mounting portion may be mounted on the vehicle axle without modification of the vehicle axle. The vehicle axle may be a front axle or a rear axle of a truck. The load sensor arrangement may comprise at least one attachment element. It may comprise one single attachment element or it may comprise a plurality of attachment elements.

The attachment element may comprise one single part or it may comprise a plurality of parts, e.g. interacting with the load sensor or with each other to form the releasable connection of the load sensor to the sensor holding portion.

Optionally, the sensor holding portion may comprise at least one part of the attachment element.

Optionally, the sensor holding portion may comprise one part of the attachment element, and the load sensor may comprise another part of the attachment element. Such that, for example, the first and second part are corresponding parts forming together an intercoupling attachment.

Optionally, the sensor holding portion comprises the single part or all parts of the attachment element. That is, the sensor holding portion is adapted to releasably attach a load sensor which per se need not be provided with specific parts of an attachment element. The attachment element may naturally still interact with the load sensor (e.g. abut against its outer surface, press against its outer surface, form a friction coupling with its outer surface etc.).

Optionally, the attachment element comprises a snap-fit element and/or a press-fit element and/or a spring element.

For example, the attachment element may comprise a snap part of the sensor holding portion which is to interact with a loop part of the load sensor. In another example, the attachment element may comprise a snap part of the sensor holding portion which is to interact with an indentation part of the load sensor. In yet another example, the attachment element may comprise a snap part of the sensor holding portion only which is to interact with the outer surface of the load sensor.

For a press-fit connection, the sensor holding portion may comprise an attachment element in the form of structures or walls adapted such that the load sensor may fit between them and be maintained by friction in a press-fit manner.

Optionally, the attachment means may comprise a spring element for biasing the load sensor to the sensor holding portion.

Optionally, the attachment element is adapted for tool-free connection of the load sensor to said sensor holding portion.

Tool-free connection of the load sensor to the sensor holding portion enables easy and time-efficient installation procedure for installing the load sensor on the vehicle axis. Since the load sensor is a non-invasive load sensor and the sensor holding portion is adapted for holding the load sensor in a position for direct measuring on the vehicle axle, the arrangement requires less exact positioning and stability than previous arrangements. This in turn enables quick and easy installation solutions.

With "tool-free" is meant that the connection may be secured without use of any tools such as screwdrivers etc. Instead, the connection may be secured by manual arrangement of the parts only, i.e. by snap-fit, pressfit or spring arrangements for example as those exemplified in the above.

Optionally, the attachment element is adapted for automatic connection of the load sensor to the sensor holding portion. With "automatic connection" is meant that once the load sensor is brought to its position in the sensor holding portion, the attachment element automatically engages so as to secure the load sensor in said position. Such an automatic connection may advantageously be created using attachment means as those discussed in the above. Hence, the attachment element may be adapted for releasable connection and automatic connection of the load sensor to the sensor holding portion.

Indeed, another load sensor arrangement may be provided as described in the above, wherein the attachment element is adapted for automatic connection, but not necessarily for releasable connection of the load sensor to the sensor holding portion. Although in such a load sensor arrangement, the load sensor is not easily replaceable, advantages in terms of swift and easy mounting of the load sensor arrangement may still be obtained.

Optionally, the mounting portion is adapted for non-invasive arrangement to the vehicle axle. With non-invasive is meant that the arrangement does not require any parts extending into the vehicle axle. That is, no holes as required for e.g. bolts or screws are required to arrange the mounting portion to the vehicle axle. This means that arrangements necessary to provide bolts, such as addition of material to the vehicle axle to ensure sufficient strength may be dispensed with. Non-invasive arrangement may also be advantageous in that it requires less space than previous solutions, and is also cost-efficient.

Optionally, the mounting portion is adapted for non-invasive arrangement to the vehicle axle by clamping or strapping.

Optionally, the mounting portion may include a clamping element which is adapted to clamp around at least a portion of the vehicle axle. The clamping element may comprise a tensioning element, e.g. a screw, for tensioning the clamping element such that it is secured in position clamping around at least a portion of the vehicle axle.

Optionally, the mounting portion may include a strapping element which is adapted to strap around a circumference of the vehicle axle.

Optionally, the mounting portion is adapted for arrangement to the vehicle axle by arrangement between the vehicle axle and a spring of a spring suspension system for the vehicle axle. According to a second aspect of the invention, the object is achieved by a vehicle axle arrangement. This arrangement may be preferred, in particular for a vehicle axle where the strain in the centre of the vehicle axle is not proportional to the load to which the axle is exposed. This is often due to additional items attached to the vehicle axle such as gearing, reinforcements or attachments. This may in particular be the case for a rear vehicle axle.

Optionally, a load sensor arrangement may be installed at each of the two springs connected to the vehicle axle.

Optionally, the mounting portion is adapted for arrangement between springs connected to the vehicle axle, preferably to the centre of the vehicle axle, more preferred to the centre of a front vehicle axle. Arrangement between springs connected to the vehicle axle allows for greater versatility when selecting the position for the load sensor arrangement. Arrangement of the mounting portion to the centre of the vehicle axle may be preferred for a vehicle axle where the strain in the centre of the vehicle axle is proportional to the load to which the axle is exposed.

Previously, load sensor arrangements have been arranged at springs because of a belief that data from the positions of both springs are necessary in order to calculate the correct loading of the vehicle. However, the inventors have found that arrangement of a load sensor at the centre of the vehicle axle may provide sufficient information. In particular it has been found that the strain in the centre of the vehicle axle may proportional to the load to which the axle is exposed, and that measurements thereof may be used to calculate the load with sufficient accuracy.

Optionally, the load sensor comprises a magnetic sensor or an optical sensor.

Optionally, the sensor holding portion comprises a protective bracket arranged to at least partly cover the load sensor on a side of the load sensor facing away from the vehicle axle. In other words, the protective bracket is arranged to at least partly cover a side of the load sensor not facing the vehicle axle, preferably the side opposite the side of the load sensor that directly faces the vehicle axle. The protective bracket advantageously provides protection for the load sensor from e.g. being exposed to liquid and/or mechanical impacts. Optionally, the protective bracket is arranged to completely cover the load sensor on a side of the load sensor opposite of the vehicle axle.

Optionally, the attachment element may be a spring element extending from the protective bracket towards the load sensor for applying a force on the load sensor for maintaining the load sensor in said position.

Optionally, the attachment element is a screw or bolt arranged to apply a force on the load sensor through a threaded hole in the protective bracket.

Optionally, the attachment element comprises protruding portions on the sensor holder portion.

Optionally, the attachment element comprises a slide connection, wherein said load sensor is configured to slide in place on the sensor holding portion.

According to a variant of the invention, there is provided a load sensor arrangement for installation of a load sensor on a vehicle axle of a vehicle, the load sensor arrangement comprises: a load sensor for measuring a load subjected to the vehicle axle; a sensor holder comprising a sensor holding portion and a mounting portion, the mounting portion is adapted for arrangement between the vehicle axle and a spring of a spring suspension system for the vehicle for holding the sensor holder in place, and the sensor holding portion is adapted for holding the load sensor in place on the vehicle axle adjacent to the spring; and, an attachment element for releasably attaching the load sensor to the sensor holder portion of the sensor holder.

In this variant, the sensor holder may be attached between and held in place by the vehicle axle and the spring. The sensor holder comprises a sensor holding portion that provides a releasable attachment means for the load sensor such that the load sensor may easily be mounted on the vehicle axle close to the spring. Further, the attachment element provides a quick connection such that the load sensor may be mounted (and replaced) on the vehicle axle without the need for specialized equipment.

By the provision of a load sensing arrangement which comprises such a sensor holder, the advantage of simple mounting of a load sensor and replacement of the load sensor without the need for disassembling the spring-axle assembly of the vehicle is provided. Furthermore, the load sensor may be mounted on the vehicle axle without modification of the vehicle axle. The vehicle axle may be a front axle or a rear axle of a truck.

The mounting portion may be interposed directly between the spring and the axle, or there may be other parts in between the mounting portion and the spring such as a so-called "rubber tower" in case the load sensing arrangement is arranged on e.g. a rear axle of a truck. A rubber tower is a rubber part arrange as a shock absorber between the rear axle and the spring, I particular in the case of a leaf spring.

The releasable attaching of the load sensor should be interpreted as that the load sensor may be removed from the sensor holder portion in a "quick-connection" manner. The load sensor may be released from the sensor holder portion without having to remove the sensor holder from the vehicle axle and spring. Accordingly, the mounting portion of the sensor holder may be maintained mounted between the vehicle axle and the spring when the load sensor is attached in (or removed from) the sensor holding portion of the sensor holder. Thus, another advantage of the invention is that the load sensor may be replaced without having to dismantle the spring from the vehicle axle. In fact, as long as the load sensor is reachable, no parts of the suspensions system have to be dismantled.

That the load sensor is arranged adjacent to the spring should be interpreted broadly. The load sensor may for example be mounted directly adjacent to the leaf spring with no other components between the load sensor and the vehicle axle, but there may also be other components between. The distance between the load sensor and the spring is defined by the size of the sensor holder which thereby defines the "adjacent".

The sensor holding portion and the mounting portion may be provided in a single part, or as two separate parts that may be assembled together prior to, or after the mounting of the mounting portion between the vehicle axle and the spring.

The spring may be a leaf spring, or an air spring, or a combination of a leaf spring and an air spring.

According to embodiments, the sensor holder portion may be adapted for being located outside of the space between the vehicle axle and the spring where the mounting portion is adapted for arrangement. Hereby, the sensor holder portion is advantageously easily accessible for installation or replacement of a load sensor, in particular without the need for removing the sensor holder form the vehicle axle and spring mounting.

According to another embodiment, a protective bracket may be arranged to at least partly cover the load sensor on a side of the load sensor opposite of the vehicle axle. In other words, the protective cover is arranged to at least partly cover a side of the load sensor not facing the vehicle axle, preferably the side opposite the side of the load sensor that directly faces the vehicle axle. The protective bracket advantageously provides protection for the load sensor from e.g. being exposed to liquid and/or mechanical impacts.

According to one embodiment, the attachment element is a spring suspended between the protective bracket and the load sensor for applying a force on the load sensor for maintaining the load sensor in place on the vehicle axle. Hereby, the spring provides a resilient attachment means adapted to apply a force on the load sensor pushing it in a direction towards the vehicle axle for holding the load sensor in place. Furthermore, by compressing the spring an installed load sensor may be easily removed from the sensor holding portion. Accordingly, an advantageous way for providing a releasable attachment for the load sensor is provided.

According to another embodiment, the attachment element is a screw or bolt arranged to apply a force on the load sensor through a threaded hole in the protective bracket. Hereby, a further advantageous releasable attachment for the load sensor is provided.

According to another embodiment, the attachment element is a slide connection, wherein the load sensor is configured to slide in place on the sensor holding portion and to be held in place by protruding portions on the sensor holder portion matching with holes in the load sensor. The protruding portions extend into the holes in the load sensor when the load sensor is in its proper position on the sensor holding portion. When the load sensor is slid in place, the protruding portions may be deflected away by the force applied from the load sensor. As the deflected protruding portions coincide with the holes on the sensor holding portion, the protruding portions snap into place in the holes as the force on the from the load sensor is relieved. The slide connection further comprises a groove on one of the load sensor and the sensor holding portion, and a matching flange on the other one of the load sensor and the sensor holding portion. The flange fits into the groove such that the flange may be slid into the groove. This attachment element is another advantageous way for providing a simple releasable attachment for the load sensor on the sensor holding portion of the sensor holder.

In one embodiment of the invention, the sensor holding portion comprises guiding elements for guiding the load sensor when the load sensor is slid onto the sensor holding portion, wherein the guiding elements restrict a motion of the load sensor transversal to the slide direction of the load sensor when the load sensor is slid onto the sensor holding portion. Hereby, an advantageous way of ensuring that the load sensor is mounted in the correct position on the sensor holder is provided. Further, with the guiding elements the mounting of the load sensor may be performed faster than without guiding elements.

According to yet another embodiment, the sensor holder comprises protruding portions extending, when mounted on the vehicle axle, away from the vehicle axle and along side portions of the spring such that the sensor holder is prevented from movement in a direction along the main axis of the vehicle axle. The protruding portions thus hold the sensor holder in place at least along the main axis direction of the vehicle axle by the protruding portions catching on to the side of the spring. Hereby a simple yet reliable way of preventing movement of the sensor holder at least in one direction is provided.

According to embodiments, the mounting portion may comprise a through-hole for mounting on a pin protruding from the spring. Hereby, another reliable way of ensuring that sensor holder is kept in place on the vehicle axle is provided.

One possible advantageous way for holding the sensor holder in place includes that the sensor holder may be held in place by a pressure applied from the leaf spring when mounted on the vehicle axle.

According to a second aspect of the invention, the object is achieved by a vehicle axle arrangement. According to the second aspect of the invention, there is provided a vehicle axle arrangement comprising a vehicle axle and a load sensor arrangement according to the first aspect of the invention.

According to a third aspect of the invention, the object is achieved by a vehicle. According to the third aspect of the invention, the vehicle comprises at least one load sensor arrangement in accordance with the first aspect of the invention, and/or vehicle axle arrangement in accordance with the second aspect of the invention.

Optionally, the load sensor arrangement is arranged between springs connected to the vehicle axle, preferably the load sensor arrangement is arranged to the centre of a vehicle axle, more preferred to the centre of a front vehicle axle.

Optionally, the load sensor arrangement is the only load sensor arrangement arranged to the vehicle axle, preferably the front vehicle axle.

Optionally, the vehicle comprises a spring of a spring suspension system for the vehicle, and wherein the load sensor arrangement is arranged adjacent said spring, preferably between the vehicle axle and said spring. Preferably, the vehicle axle is in this case a rear vehicle axle.

According to a fourth aspect of the invention, the object is achieved by a method. According to the fourth aspect of the invention, there is provided a method for installing a non-invasive load sensor on a vehicle axle comprising the steps of: arranging a sensor holder to said vehicle axle, such that the sensor holder is arranged to hold the load sensor in a position for direct measuring on the vehicle axle, and attaching said sensor to the sensor holder by releasable connection to the sensor holder.

Optionally, the step of arranging a sensor holder to said vehicle axle comprises non-invasively arranging the sensor holder to the vehicle axle, preferably by clamping or strapping.

In a variant of the fourth aspect of the invention, there is provided a method for installing a load sensor on a vehicle axle adjacent to a spring suspension of a vehicle, the method comprises: arranging a sensor holder between the vehicle axle and a spring of the spring suspension, the sensor holder comprises a sensor holding portion and a mounting portion, wherein the mounting portion is held in place between the vehicle axle and the spring by a pressure applied from the spring when mounted on the vehicle axle, wherein the sensor holder portion is located outside the space between the vehicle axle and the spring where the mounting portion is arranged; and attaching a load sensor on the sensor holder portion.

In a fifth aspect of the invention there is provided the use of a load sensor arrangement in accordance the first aspect of the invention for measuring a load subjected to a vehicle axle.

In a variant of the fifth aspect of the invention, there is provided a use of a non-invasive load sensor for measuring a load subjected to a vehicle axle, the non-invasive load sensor is attached to a sensor holder comprising a sensor holding portion and a mounting portion, the mounting portion is adapted for arrangement between the vehicle axle and a spring of a spring suspension system of the vehicle for holding the sensor holder in place, the sensor holding portion is adapted for holding the non-invasive load sensor in place on the vehicle axle adjacent to the spring, wherein the non-invasive load sensor is releasably attached to the sensor holding portion with an attachment element.

It will be understood that effects and features as described with reference to any one of the aspects or variants of the invention may be applied also to the other aspects of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
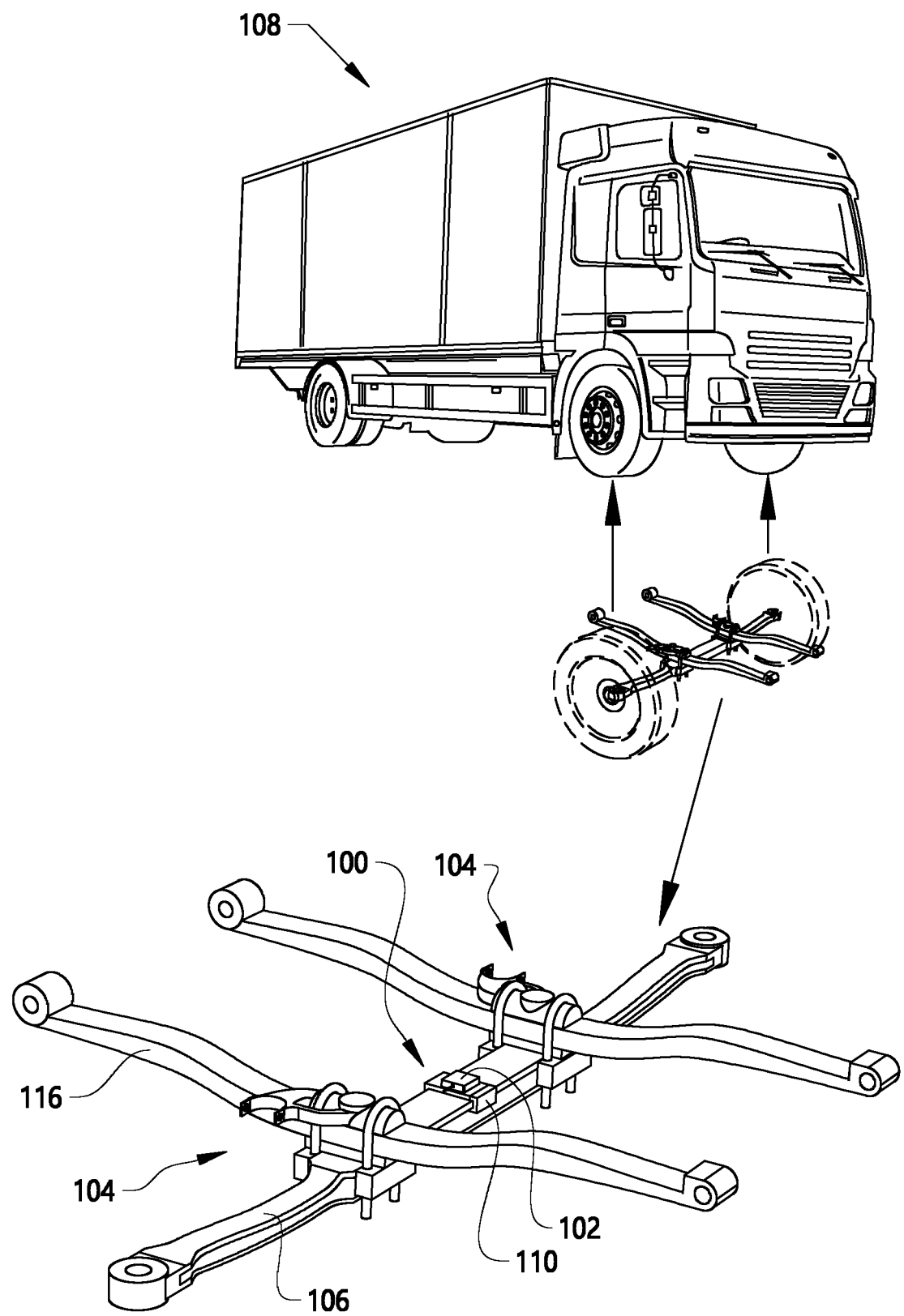
FIG. 1 shows a vehicle comprising a load sensing arrangement on a front axle according to embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference characters refer to like elements throughout the description.

FIG. 1 schematically illustrates a vehicle in the form of a truck 108 comprising spring suspensions system in the form of leaf spring suspensions 104. Each of the leaf spring suspensions 104 comprises a leaf spring 116 arranged on a vehicle axle 106. Wheels for the vehicle are mounted via e.g. kingpin arrangements (not shown) on each side of the vehicle axle 106. The leaf springs 116 are fixed to a vehicle frame (not shown) with fixing members such as e.g. bolts at distal end portions of the leaf springs 116. Accordingly, the leaf springs 116 provide suspension for the vehicle axle 106. Furthermore, a load sensor arrangement 100 provides for a load sensor 102 to be arranged to the vehicle axle 102 as will be described in more detail with reference to the subsequent drawings. In FIG. 1 the load sensing arrangement is arranged on the front axle 106 of the truck 108. In FIG. 1, the load sensor arrangement 100 is arranged between the springs 116 connected to the vehicle axle 106, in particular, the load sensor arrangement 100 is arranged to the centre of the vehicle axle 106.

Figure 2:
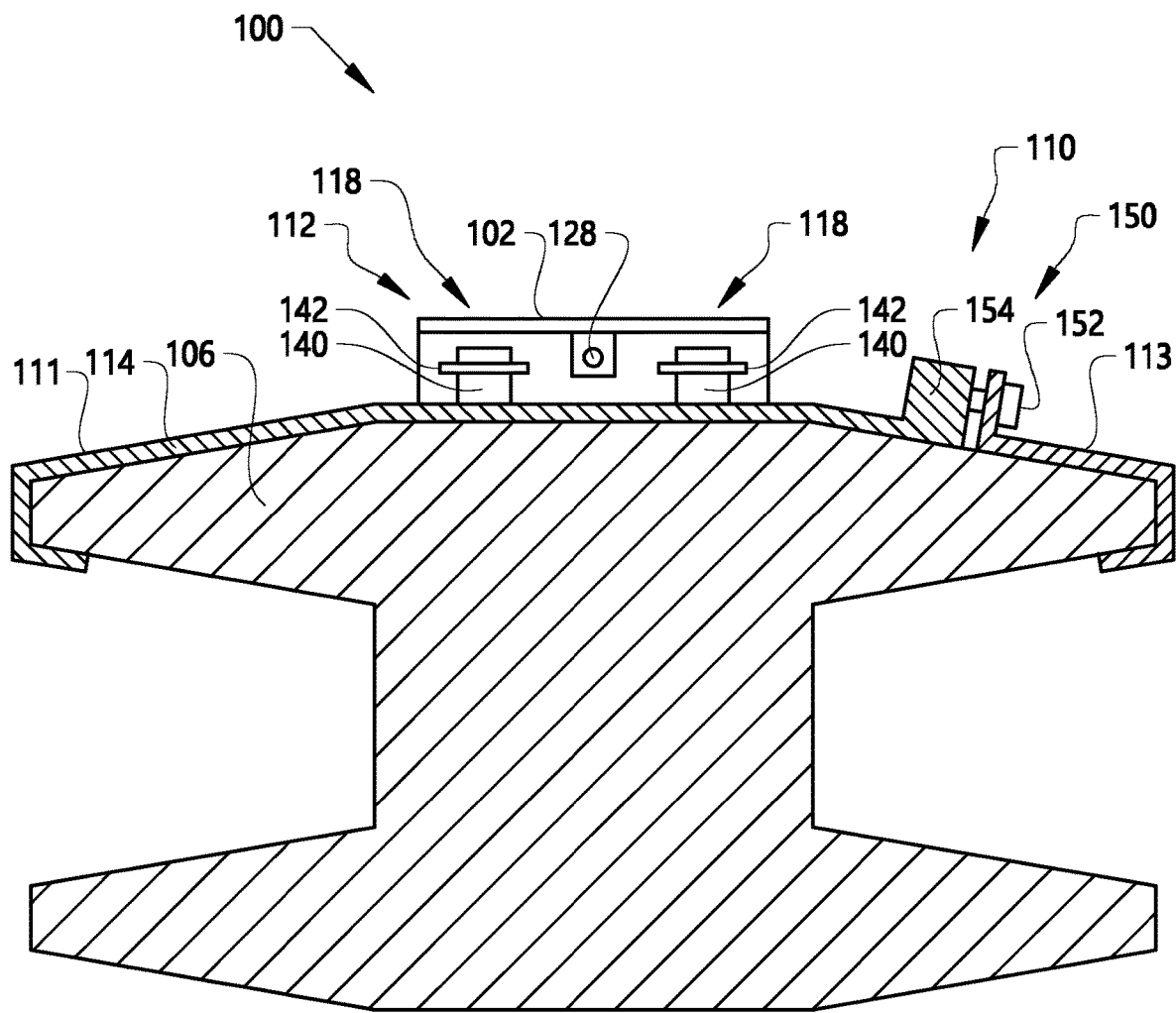
FIG. 2 conceptually illustrates a load sensing arrangement according to embodiments of the invention, when arranged on a vehicle axle.

FIG. 2 schematically illustrates an embodiment of a load sensor arrangement 100 when arranged on a vehicle axle 106. The vehicle axle 106 is shown in cross section. The load sensor arrangement 100 comprises a non-invasive load sensor 102 and a sensor holder 110. The sensor holder 110 comprises a sensor holding portion 112 and a mounting portion 114.

The mounting portion 114 is adapted for non-invasive arrangement to the vehicle axle 106. In the illustrated embodiment, the mounting portion 114 is attached to the vehicle axle 106 by clamping. To this end, the mounting portion 114 comprises a first clamping member 111 and a second clamping member 113 adapted to grasp opposing side portions of the vehicle axle 106. In the illustrated embodiment, the vehicle axle 106 has a roughly I-shaped cross-section, and the first and second clamping members 111, 113 may grasp around one of the opposing cross-bars of the I-shaped axle.

A tightening means 150 is arranged to provide a clamping force for securing the mounting portion 114 to the vehicle axle 106. In the illustrated embodiment, the tightening means 150 comprises a screw 152 arranged to the second clamping member 113 and a threading 154 in the first clamping member 111 for adjusting a distance between the first clamping member 111 and the second clamping member 113 by screwing.

The sensor holding portion 112 is adapted for holding the load sensor 102 in a position for direct measuring on the vehicle axle 106. In the illustrated embodiment, the sensor holding portion 112 is adapted for holding the load sensor 102 in a central position as seen in a cross-sectional direction of the vehicle axle 106. (As already mentioned in the above, in this embodiment the load sensor 102 is also held in a central position as seen between the springs 116.)

The load sensor arrangement 100 comprises an attachment element 118 for releasable connection of the load sensor 102 to the sensor holding portion 112. In the FIG. 2 embodiment, the attachment element 118 comprises a first snap-part 140 arranged on the sensor holding portion 112, and a corresponding loop part 142 on the load sensor 102 for forming a snap connection between the sensor holding portion 112 and the sensor 102.

Figure 3A:
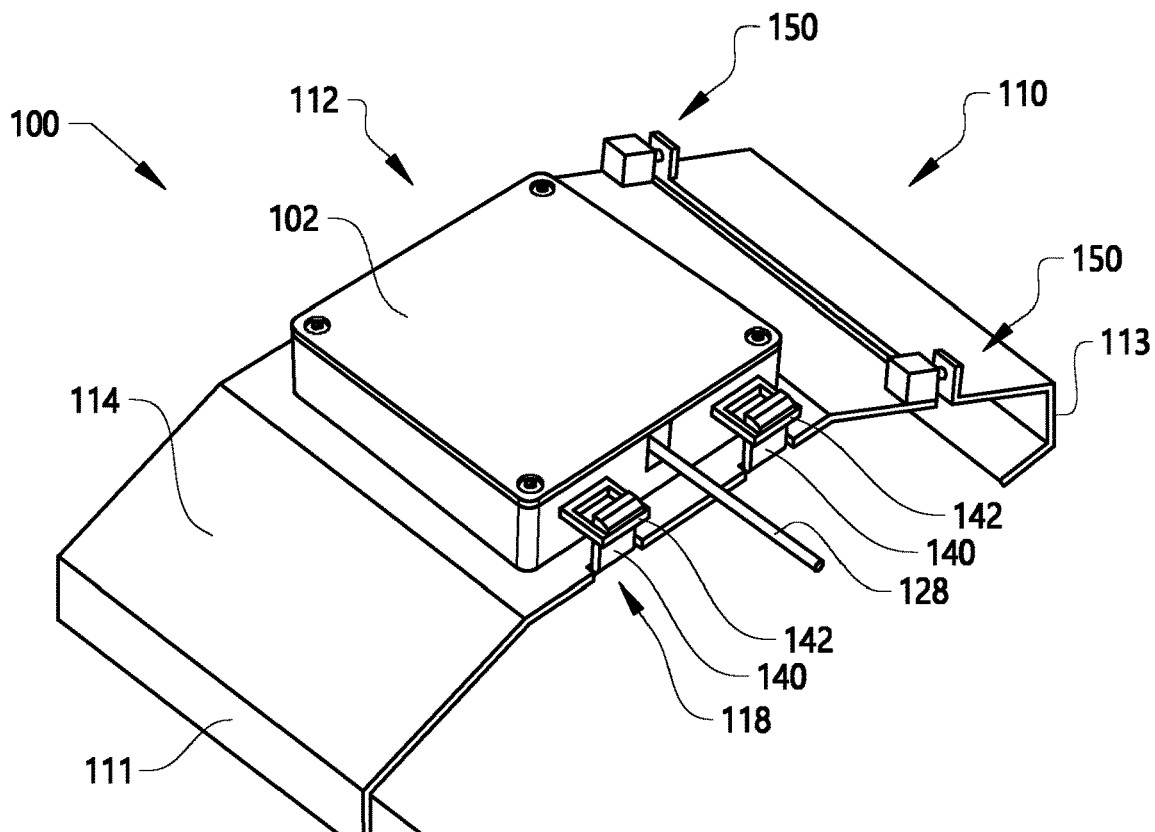
FIG. 3A conceptually illustrates a load sensing arrangement according to embodiments of the invention.

FIG. 3A shows a perspective view of the load sensing arrangement 100 of FIG. 2 which comprises a load sensor 102 and a sensor holder 110.

In FIG. 3A it is shown how in this case two tightening arrangements 150 are arranged side by side between the first clamping member 111 and the second clamping member 113. However, it is understood that only one tightening element 150 comprising a screw 152 and a threading 154 as illustrated in FIG. 2, or alternatively one or more different tightening element 150 may be used to mount the mounting portion 114 to the vehicle axle.

Also, in FIG. 3a it is illustrated how the attachment element 118 comprises two flexible snap parts 140, for forming a snap lock with corresponding loops 140 of the load sensor 102. Naturally, numerous snap-fit or other releasable attachment elements 118 may be envisaged.

Figure 3B:
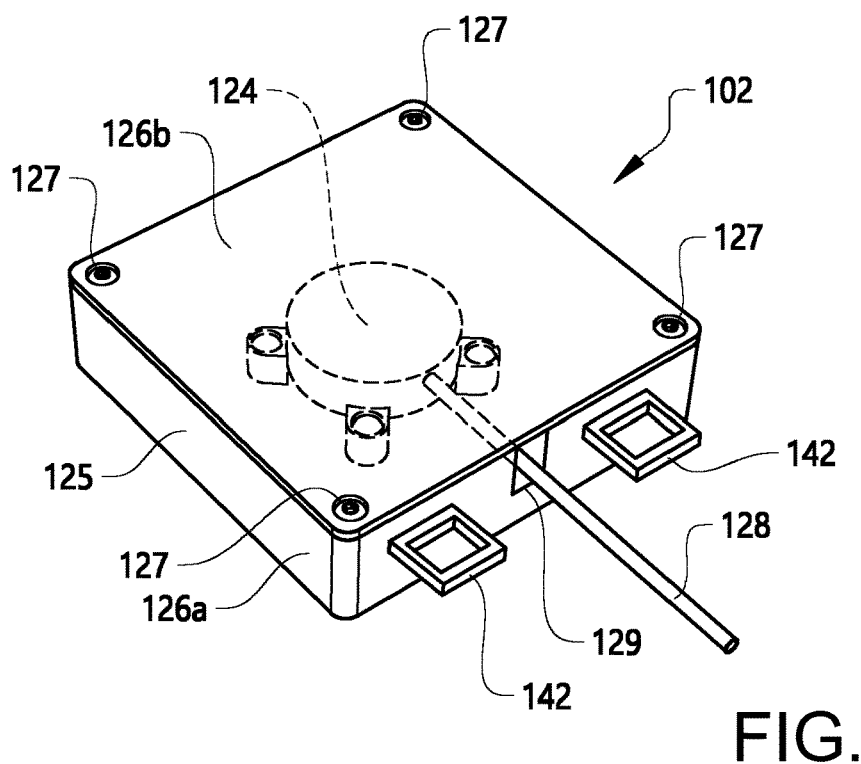
FIG. 3B conceptually illustrates a load sensor.

FIG. 3B conceptually illustrates a load sensor 102. The load sensor comprises a load sensing element 124 and a housing 125 for the accommodating the load sensing element 124. The housing 125 may for example be a plastic or a metallic (or a combination thereof) housing which provides protection for the load sensing element 124. The housing 125 in this particular example comprises a main part 126a and a lid 126b for closing the main part 126a such that the lid seals the opening in the main part through which the load sensing element may be mounted in the main part 126a. The lid 126b may be held in place by screws 127. Also the load sensing element 124 may be fastened in the housing using e.g. screws. The housing 125 may further accommodate electronics for driving the load sensor 102. The electronics may be mounted on a PCB. The housing 125 may be filled with a potting material which means that the entire housing 125 with the load sensing element 124 and the electronics will have to be replaced in case the load sensor 102 needs to be replaced.

A cable 128 for collecting load sensing data from the load sensing element 124 is arranged through a through-hole 129 in the housing 125. The though-hole 129 may be made water tight by an appropriate sealant such as rubber. The cable 128 may be connected to a vehicle electric control unit (ECU, not shown) for analysing the load sensing data and presenting it to a user or take another action.

The load sensing element 124 may be of various types. In one embodiment the load sensing element 124 comprises a plurality of coils (not shown) wound from a conductive wire such as copper. An electrical current is passed through at least one of the coils such that a first magnetic field is produced. The magnetic field is directed into the vehicle axle 106, 106' in which an inductive response is generated by the magnetic field. This inductive response causes a second magnetic field which emanates from the vehicle axle 106, 106' and may be measured by at least a second coil of the plurality of coils. By appropriate analysis of the first and the second magnetic field a load on the vehicle axle 106, 106' may be estimated. It should be noted that this type of sensor is known per se to the skilled person.

The load sensing element 124 measures the axle load in a non-invasive way. As will be apparent in the following description, the load sensor 102 only has to come close to the vehicle axle 106, and there is no need for exerting any physical action on the axle 106, 106' that may compromise the axle strength or design, for mounting of the load sensor 102. Accordingly, the load sensor 102 may be mounted on a present vehicle axle 106, 106' with having to modify the vehicle axle 106, 106' or the suspension system 104.

As described in relation to FIGS. 2 and 3a, in the embodiment of FIG. 3b, the load sensor 102 comprises loop parts 142 for forming part of an attachment means 118 for releasably attaching the load sensor 102 to the sensor holding portion 112 as illustrated in FIG. 3a. Here, the loop parts 142 are formed by structures protruding from the main part 126a of the load sensor 102.

The snap-fit connections illustrated in FIGS. 2-3b may naturally be varied. For example, the main part 126a may instead comprise indentations into which snap-parts 140 of the sensor holding portion 112 may engage. Or in another example, snap-parts 140 of the sensor holding portion 112 may engage e.g. the lid 126b of the load sensor 102.

As understood from the above, in the embodiment of FIGS. 2-3a, the load sensor 102 is connected to the sensor holder 110 by introduction of the load sensor 102 to the sensor holder 110 from a generally vertical direction (presuming the vehicle axle will extend in a generally horizontal direction). The attachment element 118 provides an automatic connection meaning that by positioning the load sensor 102 in the sensor holding portion 112, the snap parts 140, 142 will automatically engage so as to secure the load sensor 102 to the sensor holding portion 112.

Figure 4:
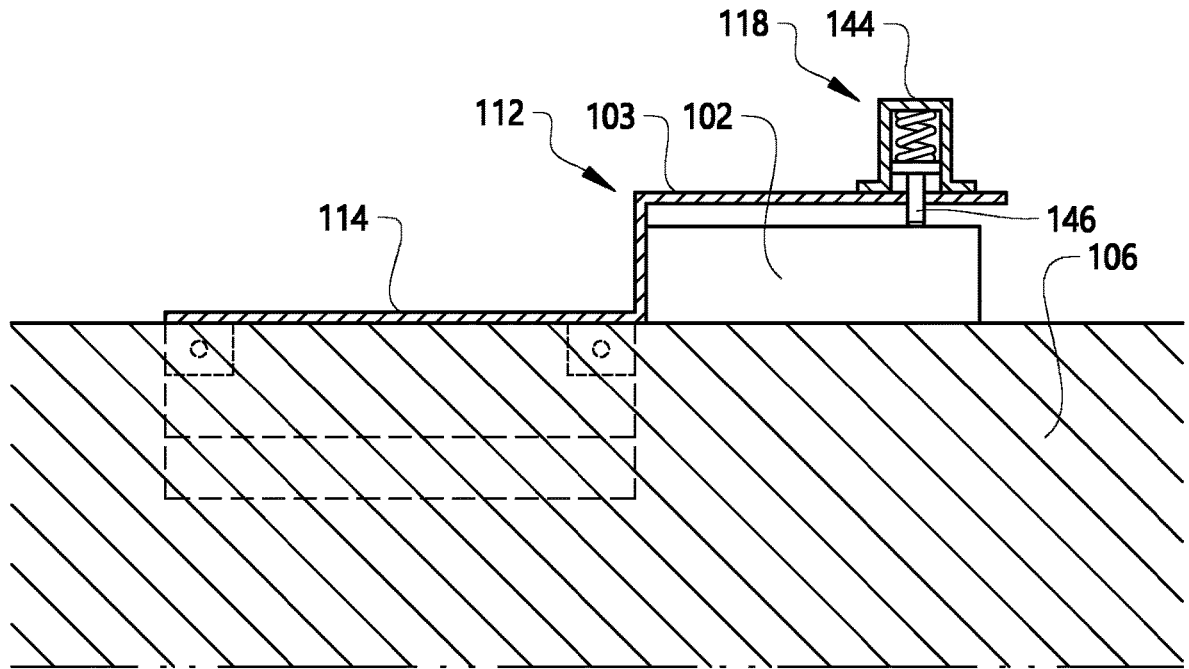
FIG. 4 conceptually illustrates a sensor holder arranged on a spring according to embodiments of the invention.
Figure 5:
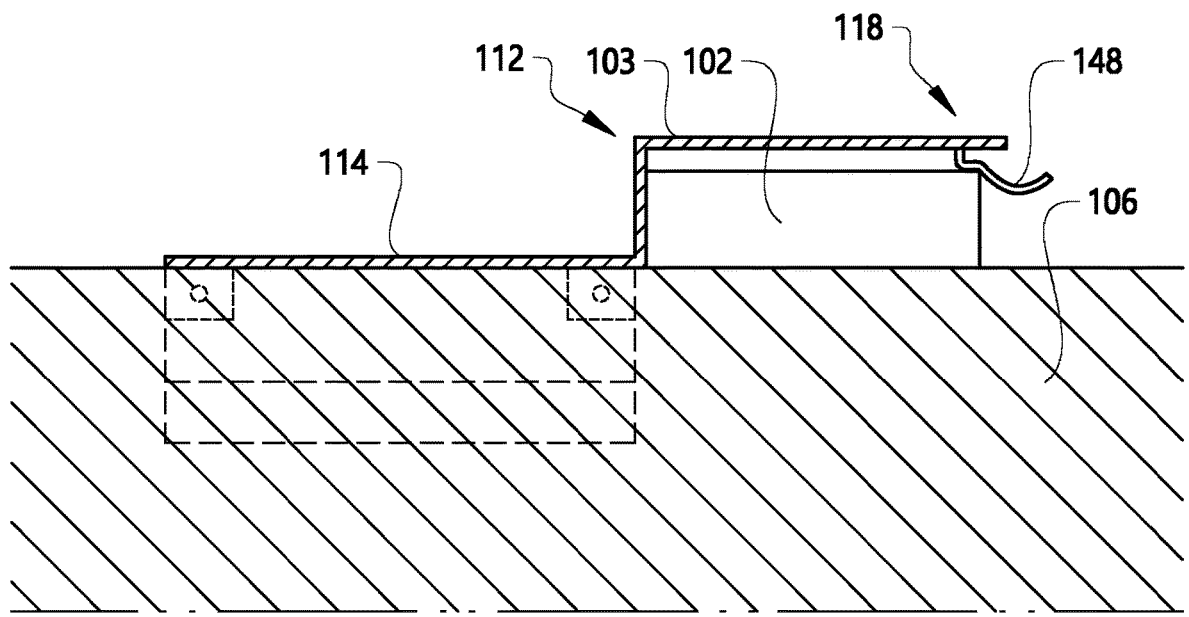
FIG. 5 conceptually illustrates a load sensing arrangement according to embodiments of the invention.

FIG. 4 and FIG. 5 conceptually illustrate further embodiments of the load sensing arrangement.

In FIG. 4, there is conceptually shown a load sensor arrangement 100 comprising a sensor holder 110 and a load sensor 102. The sensor holder 110 comprises a mounting portion 114 which may for example be a mounting portion as illustrated in FIGS. 2-3a. In the embodiment of FIG. 4, the sensor holding portion 112 further comprises a protective bracket 103. The protective bracket 103 may be made from a plastic material or a metal, or a combination thereof. The protective bracket 103 is arranged to cover the load sensor 102 and to provide protection for the load sensor 102 from physical damage. As illustrated in FIG. 4, the protective bracket 103 may be formed as an extension of the material forming the mounting portion 114.

In the embodiment shown in FIG. 4, the attachment element 118 is adapted to provide a spring connection. The attachment element 118 comprises an abutment element 146 attached to the end of a spring 144 arranged in connection with the protective bracket 103. The spring 144 will bias the abutment element 146 towards the load sensor 102. When the load sensor 102 is in place in the sensor holding portion 112, the spring element 118 applies a pressure on the load sensor 102 through a through-hole of the protective bracket 103. Hence, the load sensor 102 is maintained in the sensor holding portion 112.

FIG. 5 illustrates another embodiment wherein the sensor holding portion 112 comprises a protective bracket 103 as described in relation to FIG. 4. Instead of the spring 144 and the abutment element 146, the attachment means 118 comprises a spring element such as a resilient member 148. The resilient member 148 is attached to the protective bracket 103 which covers the load sensor 102. Further, the spring 148 is adapted to apply a spring force to the load sensor 102 such that the load sensor 102 is pushed and held in place against the vehicle axle 106. With the resilient element, such as the spring 148, the load sensor 102 is conveniently mounted in the sensor holding portion 712 by pushing the load sensor 102 in under the protective bracket 103 such that the spring 148 is compressed to allow the load sensor 102 to enter the space between the protective bracket 103 and the vehicle axle 106.

Accordingly, also in the embodiments of FIGS. 4 and 5, the attachment element 118 provides for automatic connection since the load sensor 102 will automatically be secured once positioned in the sensor holding portion.

As understood from the above, in the embodiment of FIGS. 4-5, the load sensor 102 is connected to the sensor holder 110 by introduction of the load sensor 102 to the sensor holder 110 from a generally horizontal direction (presuming the vehicle axle will extend in a generally horizontal direction).

Although in FIGS. 4-5 the protective brackets 103 are arranged so as to extend over the vehicle axle 106, i.e. forming a space for the load sensor 102 between the protective bracket 103 and the vehicle axle 106, other embodiments may be envisaged, for example where the protective bracket 103 instead extends over the mounting portion 114.

Figure 6A:
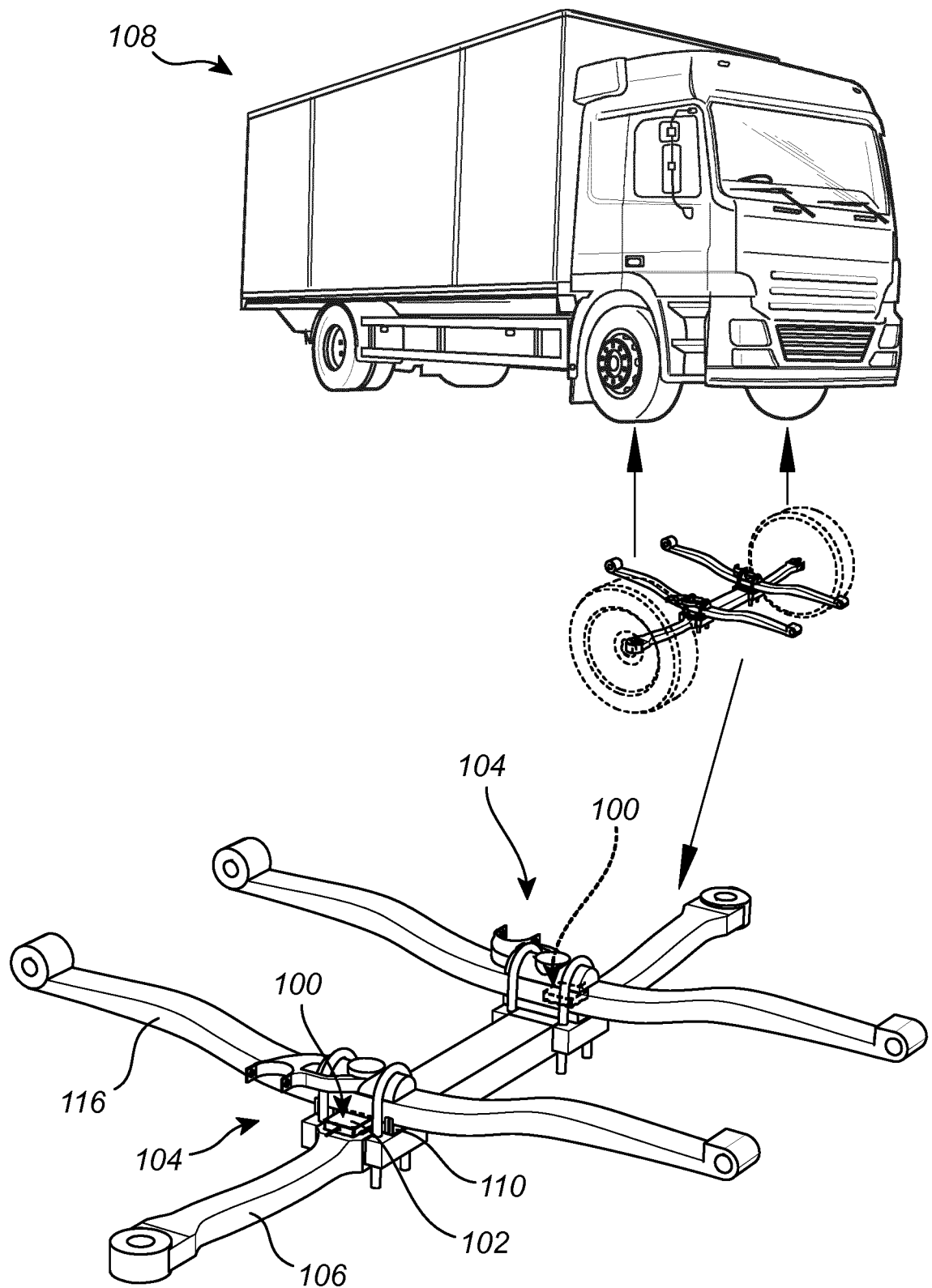
FIG. 6A is a vehicle comprising a load sensing arrangement on a front axle according to embodiments of the invention.
Figure 6B:
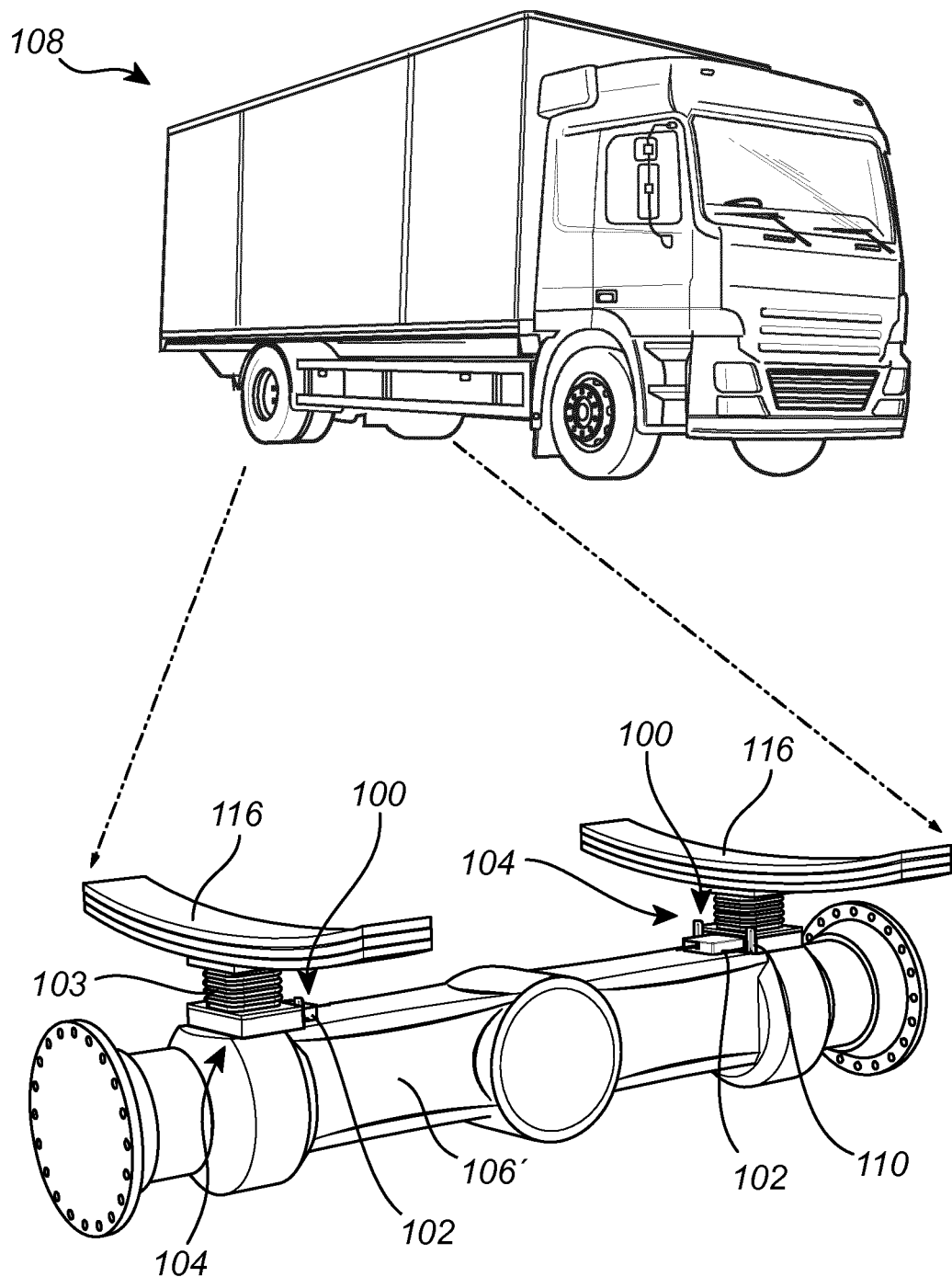
FIG. 6B is a vehicle comprising a load sensing arrangement on a rear axle according to embodiments of the invention.

FIG. 6A schematically illustrates another embodiment of a vehicle in the form of a truck 108 comprising spring suspensions system in the form of leaf spring suspensions 104. Each of the leaf spring suspensions 104 comprises a leaf spring 116 arranged on a vehicle axle 106. Wheels for the vehicle are mounted via e.g. kingpin arrangements (not shown) on each side of the vehicle axle 106. The leaf springs 116 are fixed to a vehicle frame (not shown) with fixing members such as e.g. bolts at distal end portions of the leaf springs 116. Accordingly, the leaf springs 116 provide suspension for the vehicle axle 106. Furthermore, a load sensor arrangement 100 provides for a load sensor 102 to be arranged adjacent to the leaf spring 116 as will be described in more detail with reference to the subsequent drawings. In FIG. 6B the load sensing arrangement is arranged on the front axle 106 of the truck 108.

FIG. 6B shows an alternative arrangement location for a load sensing arrangement 100 according to embodiments or the invention. In FIG. 6B, the load sensing arrangement is arranged on a rear axle 106' of a truck 108. Accordingly, the load sensor arrangement 100 provides for a load sensor 102 to be arranged adjacent to a spring 116 (e.g. a leaf spring) similar to the arrangement on the front axle as shown in FIG. 1B. In case of the rear axle, a sensor holder portion is arranged between the spring 116 and the rear axle 106' similarly as for the front axle 106 as will be described with reference to subsequent drawings. However, in case of the rear axle 106', there may be a rubber tower 103 interposed between the rear axle 106' and the spring 116. The sensor holder portion may be arranged between the rubber tower 103 and the rear axle 106'. The rubber tower is arranged as a shock absorber between the spring 116 and the rear axle 106'.

The subsequent drawings will describe the load sensing arrangement with reference to an exemplary arrangement on a front axle of a truck.

Figure 7A:
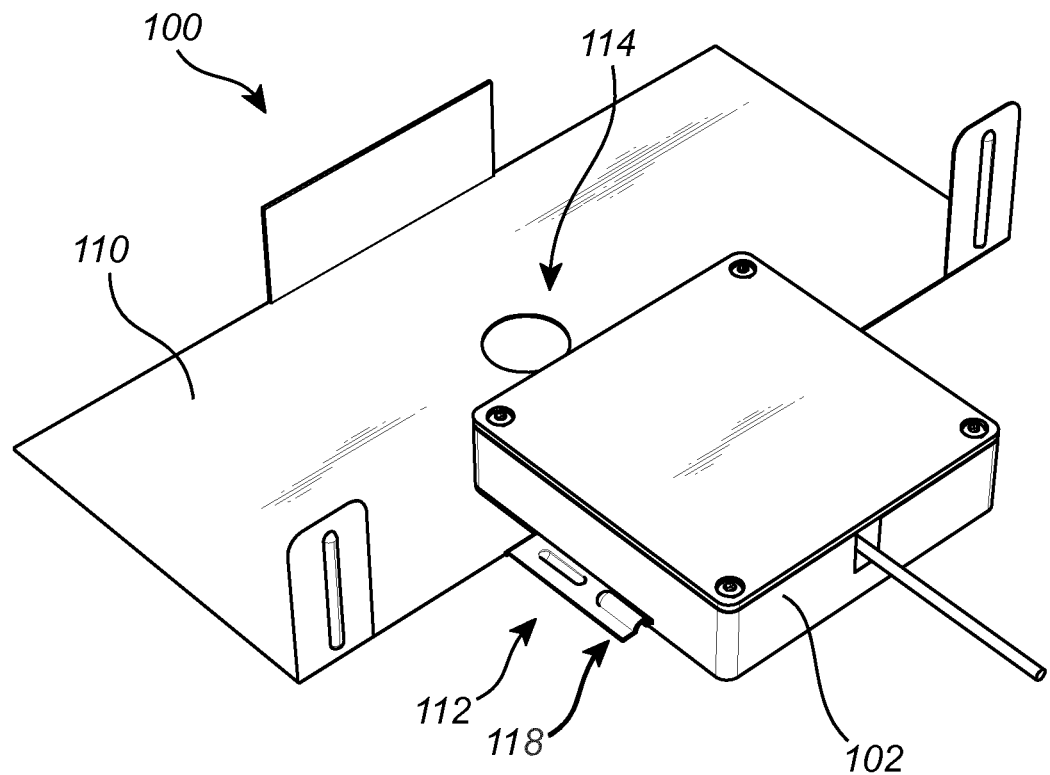
FIG. 7A conceptually illustrates a load sensing arrangement according to embodiments of the invention.

FIG. 7A shows a closer view of the load sensing arrangement 100 which comprises a load sensor 102 and a sensor holder 110. The sensor holder 110 comprises a sensor holder portion 112 and a mounting portion 114. The mounting portion 114 is adapted to be installed interposed between a vehicle axle and a spring of a spring suspension in such a way that the sensor holder 110 is held in place. The sensor holder portion 112 is adapted to hold the load sensor 102 in place by means of an attachment element as will be described with reference to subsequent drawings.

Figure 7B:
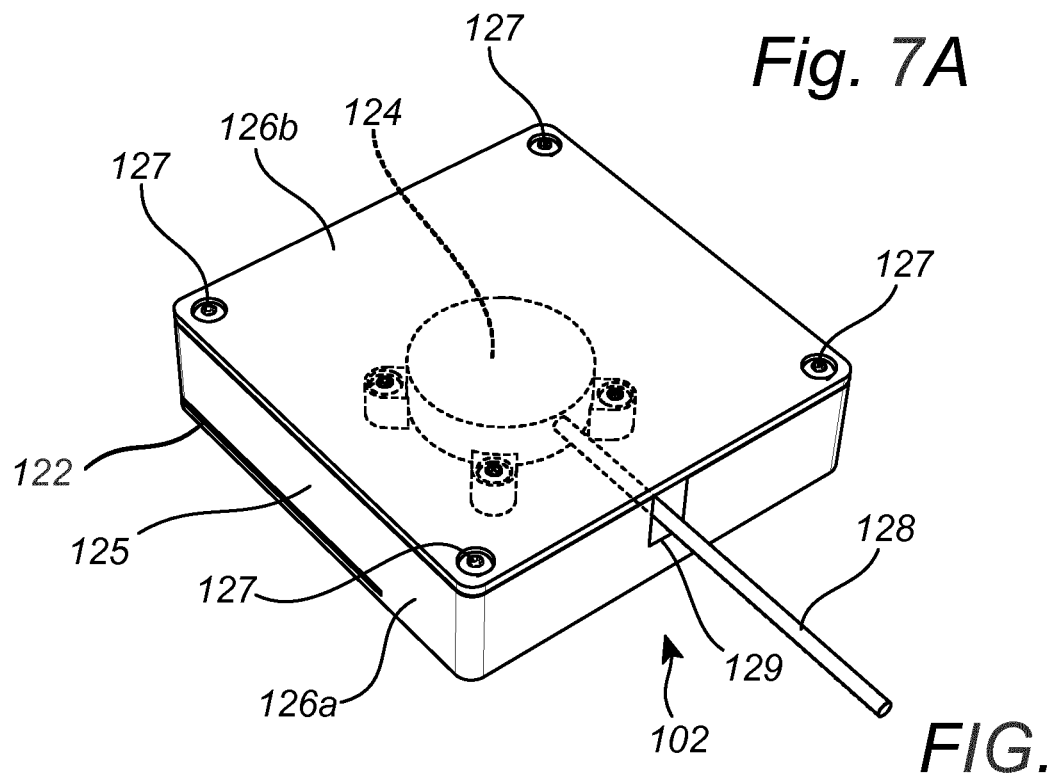
FIG. 7B conceptually illustrates a load sensor.

FIG. 7B conceptually illustrates a load sensor 102. The load sensor comprises a load sensing element 124 and a housing 125 for the accommodating the load sensing element 124, generally as described in relation to FIG. 3B. However, the attachment means 118 (shown in FIGS. 7A and 10) are adapted for a slide-in connection to the sensor holding portion 112 as will be described in the below.

Figure 8:
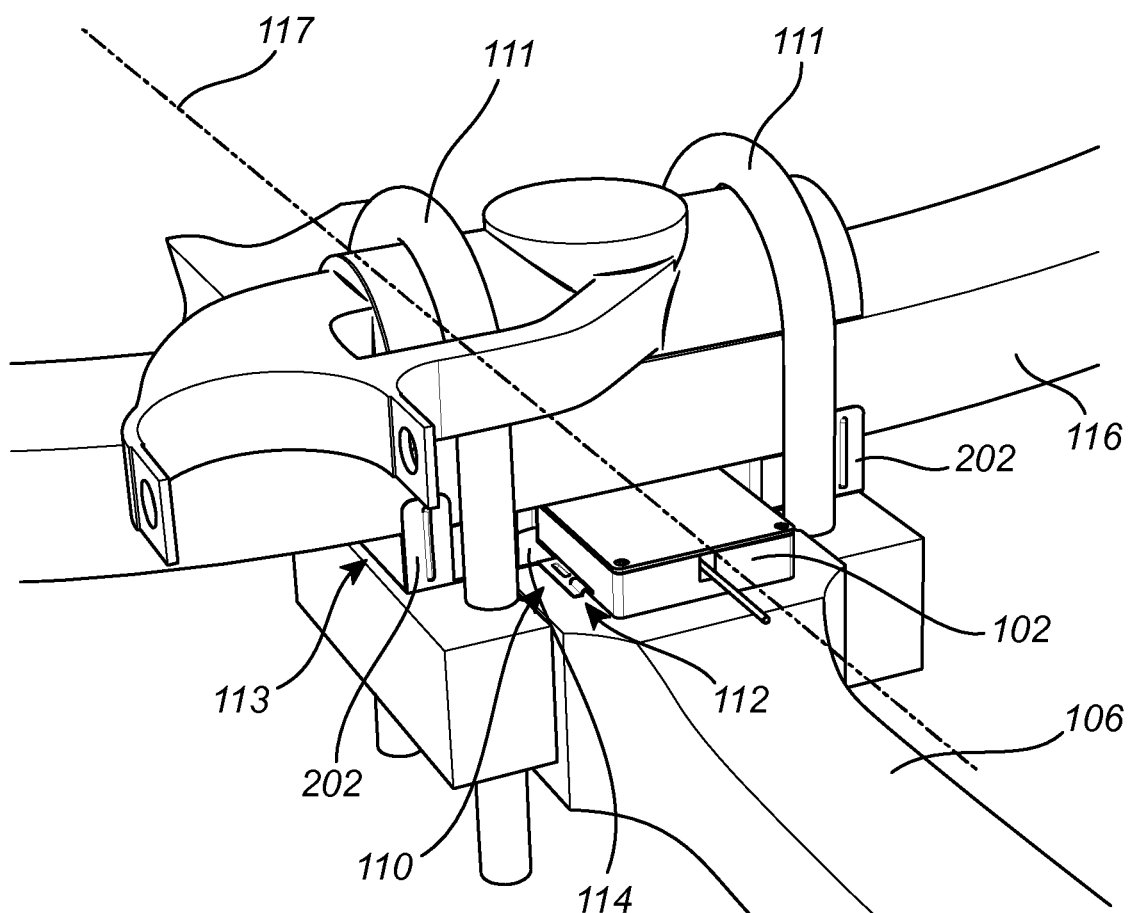
FIG. 8 conceptually illustrates a load sensor arrangement in place on a vehicle axle.

FIG. 8 illustrates a load sensor arrangement in place on a vehicle axle 106. The spring is here illustrated as a leaf spring 116 attached to the vehicle axle 106 by means of U-bolts 111 bolted to the vehicle axle 106 for holding the leaf spring 116 in place.

The mounting portion 114 of the sensor holder 110 is interposed between the leaf spring 116 and the vehicle axle 106 and is held in place at least partly by the pressure applied by the leaf spring 116 on the vehicle axle 106 caused by the U-bolts 113. The load sensor 102 is attached to the sensor holding portion 112 of the sensor holder 110.

In FIG. 8 there is further shown protruding portions 202 of the sensor holder 110. The protruding portions are substantially perpendicular with the base 113 of the mounting portion 114 such that the protruding portions 202 extend away from the vehicle axle 106. The protruding portions 202 are arranged to prevent the sensor holder 110 from sliding out of place in a direction parallel with the main axis 117 of the vehicle axle 106. The protruding portions 202 thus provide a stop for such a sliding motion when the protruding portions 202 are in contact with the spring 116 when mounted on the vehicle axle 106. The protruding portions 202 are preferably made from a stiff material such as a hard plastic or a metal.

Figure 9:
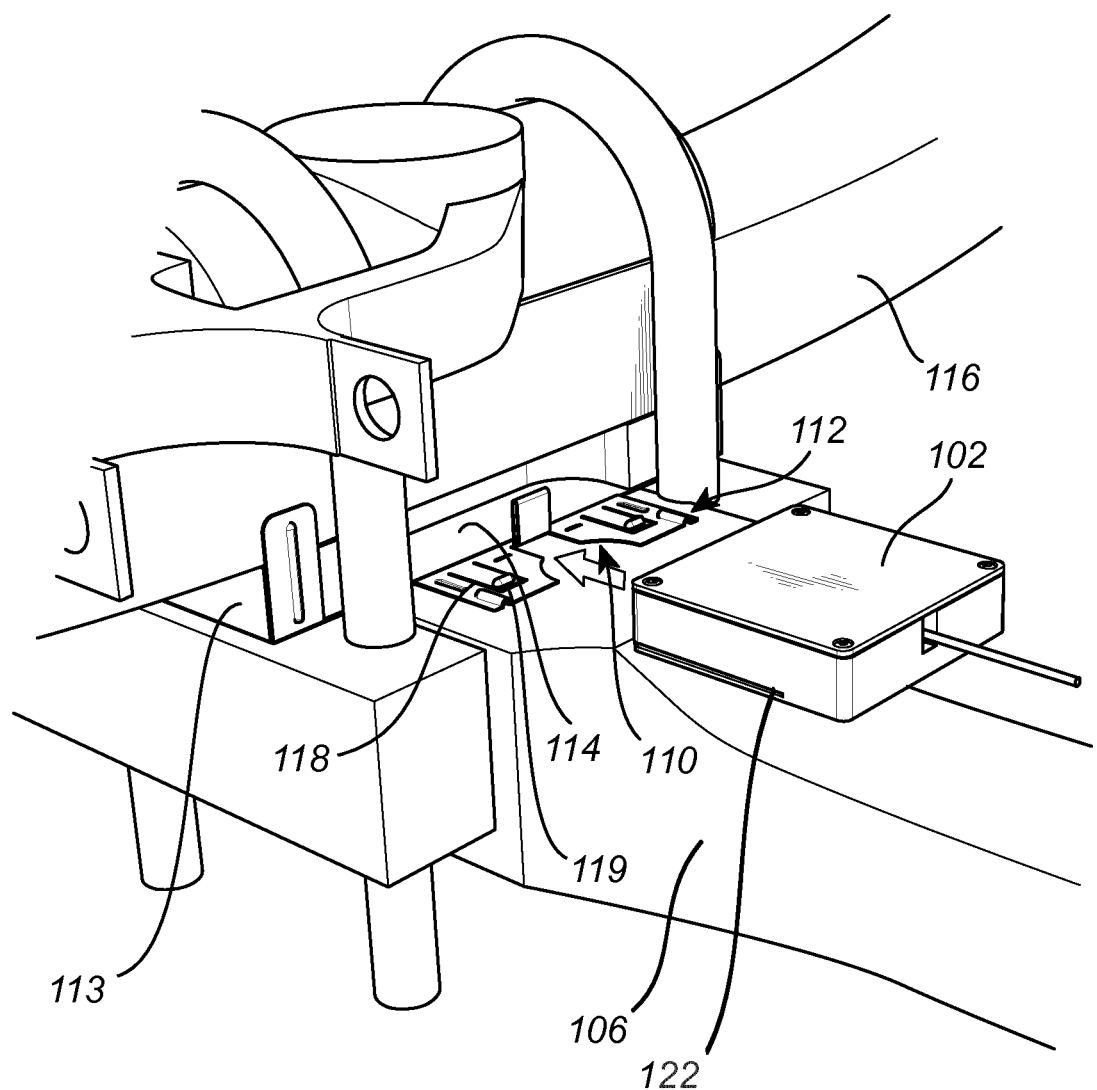
FIG. 9 conceptually illustrates a load sensor arrangement in place on a vehicle axle with the load sensor detached from the sensor holder.

FIG. 9 illustrates the load sensor 102 detached from the sensor holder 110. As mentioned, the sensor holder 110 is held in place by the pressure applied on the mounting portion 114 by the leaf spring as it is attached on the vehicle axle 106. It should be noted that it is the force required for holding the leaf spring 116 in place that is utilized for holding the sensor holder 110 in place, and not the spring force generated in the leaf spring 116. The mounting portion 114 is interposed in the space between the leaf spring 116 and the vehicle axle 106. The sensor holding portion 112 is on the other hand located outside the space between the leaf spring 116 and the vehicle axle 106 such that the load sensor 102 can be attached to the sensor holding portion 112 with attachment elements 118.

The mounting portion 114 has a relatively planar base 113 (see also FIG. 8 or FIG. 12) which is arranged between the leaf spring 116 and the vehicle axle 106. The sensor holding portion 112 is also relatively planar, i.e. it extends in a main plane, and this main plane coincides with the plane of the planar base 113 of the mounting portion 114. Accordingly, when the sensor holder is mounted in place, i.e. with the mounting portion 114 between the leaf spring 116 and the vehicle axle 106, then the sensor holder portion lies flat on the vehicle axle 106. In this way, the load sensing element 124 (see FIG. 7B) of the load sensor 102 is conveniently placed close to the vehicle axle 106 surface when the load sensor 102 in mounted in the sensor holder portion 112.

Figure 10:
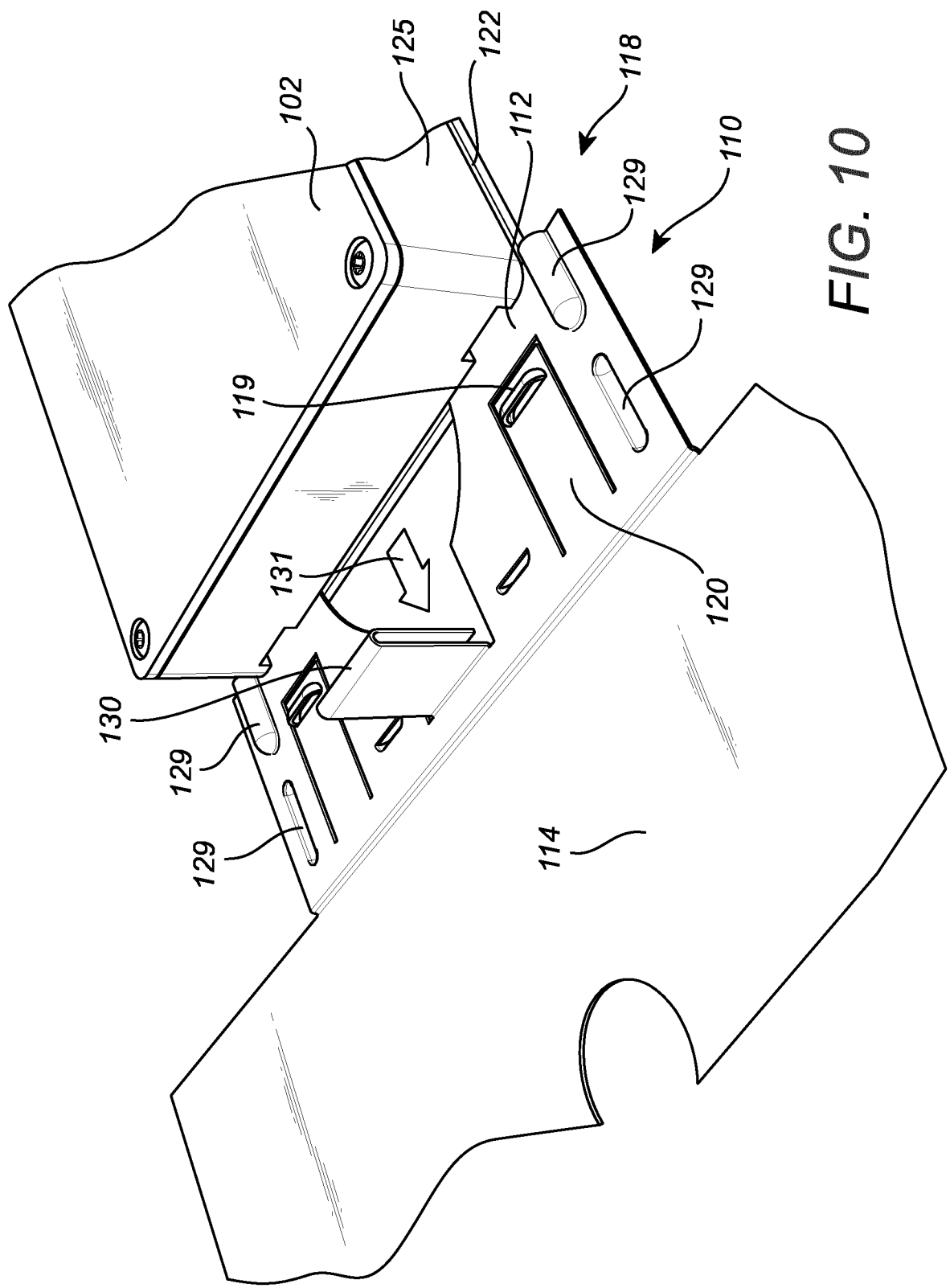
FIG. 10 is a close up view of the load sensor and the sensor holding portion according to embodiments of the invention.
Figure 11:
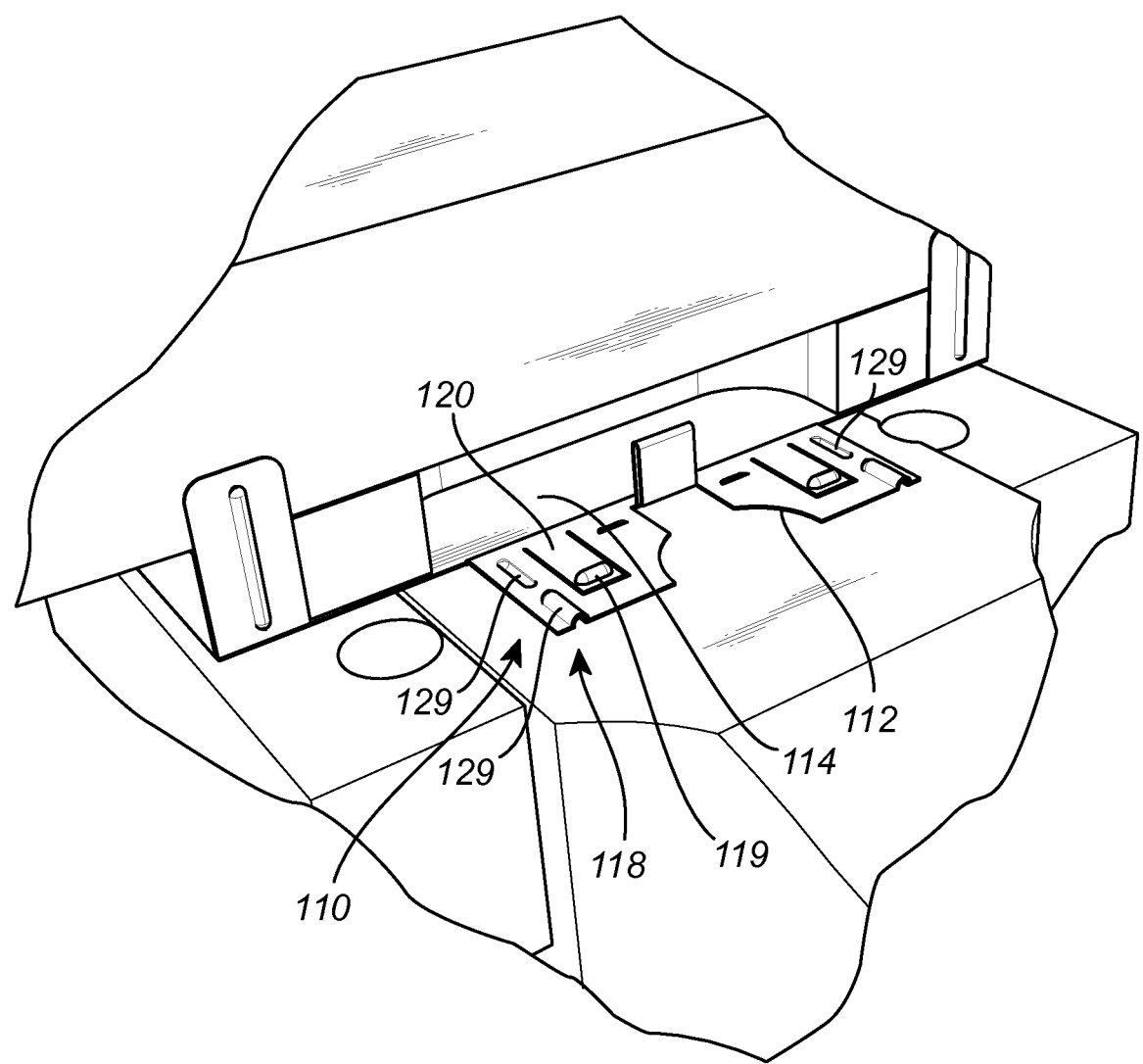
FIG. 11 is a close up view of the sensor holder mounted between a spring and a vehicle axle according to embodiments of the invention.

One type of attachment element 118 is shown in more detail in FIG. 10 and FIG. 11. In this exemplary embodiment the attachment element is a slide connection 118 comprising a protruding portion 119 which protrudes out from a flexible inner flange 120 formed in a through-hole of the sensor holding portion 112. The inner flange 120 may be resiliently flexed in a direction through the though-hole such that the protruding portion 119 may be moved in and out of the plane of the sensor holding portion 112. For mounting of the load sensor 102 on the sensor holding portion 112, at least part of the sensor holding portion 112 is slid into a groove 122 in the load sensor. The groove 122 is pre-made in the housing 125 of the load sensor 102. As the sensor holding portion 112 is slid into the groove 122 of the load sensor 102, the flexible inner flange 120 comprising the protruding portions 119 will flex in a downwards direction as viewed in FIG. 10, by the load sensor 102 pushing on the protruding portions 119. As the load sensor 102 is moved further in, the protruding portions 119 will eventually coincide with matching holes (not shown) in the groove 122. The protruding portions 119 then snaps in place when the flexible inner flange 120 flexes back. Consequently, the load sensor 102 has been attached to the sensor holding portion 112 of the sensor holder 110.

With further reference to FIG. 10 and FIG. 11, the sensor holding portion 112 comprises guiding elements 129 for ensuring that the load sensor 102 is slid onto the sensor holding portion 112 in the correct transversal location. Thus, the guiding elements 129 are adapted to restrict the motion of the load sensor 102 in a transversal direction when the load sensor is slid onto the sensor holding portion 112. The transversal direction is perpendicular to the slide direction (indicated by arrow 131 in FIG. 10) of the load sensor 102 when it is being mounted in the sensor holding portion 112. The guiding element 129 protrudes out from the otherwise generally planar sensor holding portion 112. In this particular example embodiment, there are four guiding elements, two on each side of the load sensor 102 when the load sensor is mounted on the sensor holding portion 112.

Figure 12:
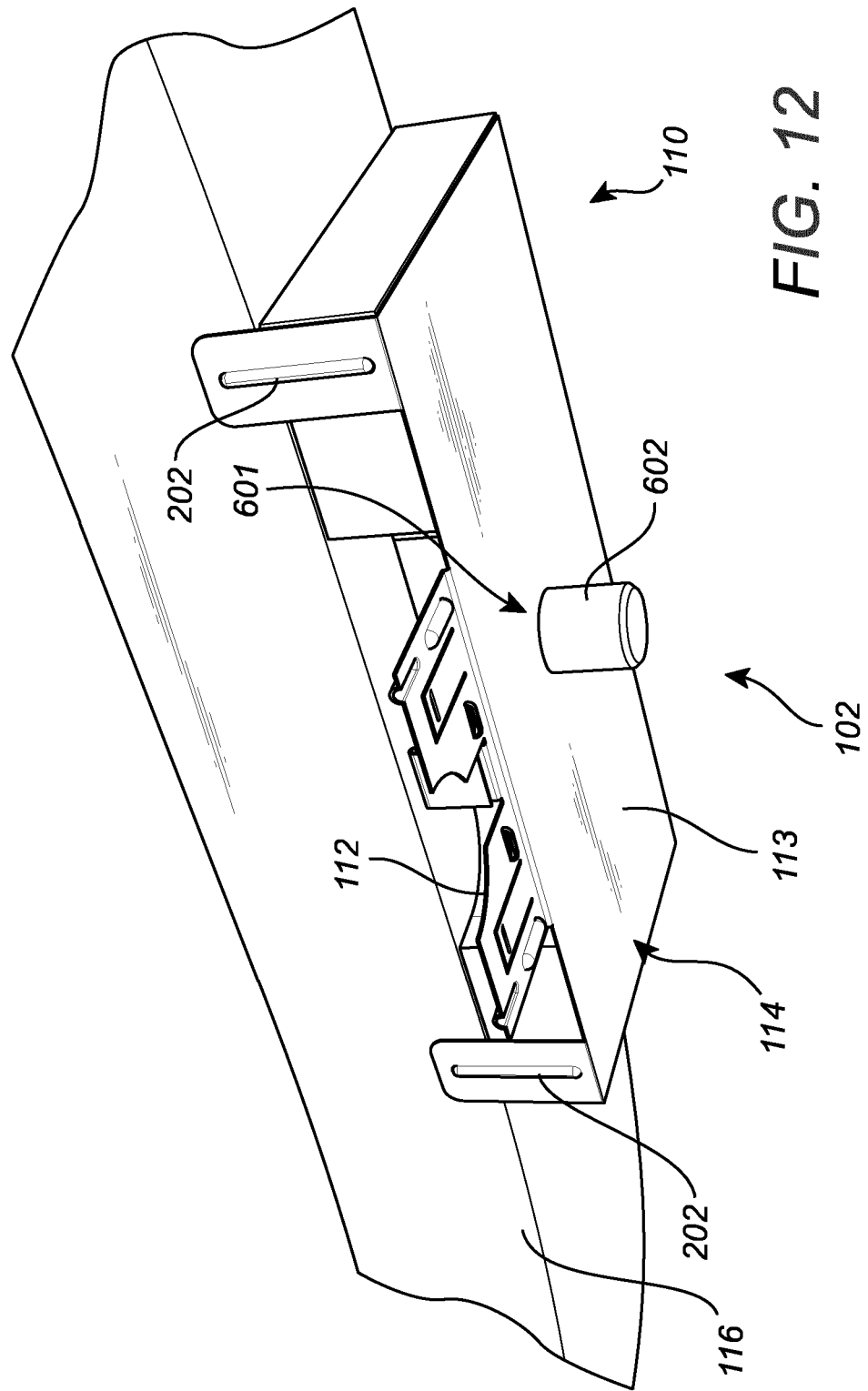
FIG. 12 conceptually illustrates a sensor holder arranged on a spring according to embodiments of the invention.

FIG. 12 conceptually illustrates the under side of the sensor holder 110. There is also shown the leaf spring 116 but the vehicle axle is not shown in FIG. 12 to be able to clearly illustrate the sensor holder 110. The sensor holder 110 comprises a sensor holding portion 112 and a mounting portion 114 as described with reference to previous drawings. The mounting portion 114 in the exemplary embodiment in FIG. 12 comprises a through-hole 601 in a generally planar base 113 that is to be mounted between the leaf spring 116 and the vehicle axle (not shown). The through-hole 601 is configured to receive a pin element 602 through the hole 601. When the pin element 602 is arranged through the through-hole 601, the sensor holder 110 is restricted in moving in the plane of the through-hole 601. The only possible motion for the sensor holder that is allowed by the pin 602 and through-hole 601 configurations would be a rotational motion about the pin element 602. However such rotational motion is prevented by the protruding portions 202 which lies against the side of the leaf spring 116 which acts as a stop for such rotational motions.

Although the embodiment described in relation to FIGS. 7A to 12 is described in relation to the variant where the mounting portion 114 of the load sensor arrangement 100 is adapted for arrangement between the vehicle axle 106, 106' and a spring of a spring suspension system for the vehicle, it will be understood that the attachment element 118 described may also be used for embodiments where the mounting portion 114 is adapted for other types of non-invasive arrangement to the vehicle axle 106, such as by clamping or strapping.

Figure 13:
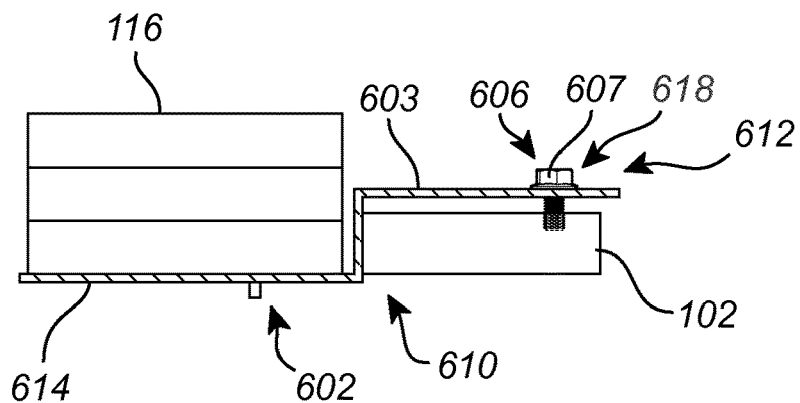
FIG. 13 conceptually illustrates a load sensing arrangement according to embodiments of the invention.
Figure 14:
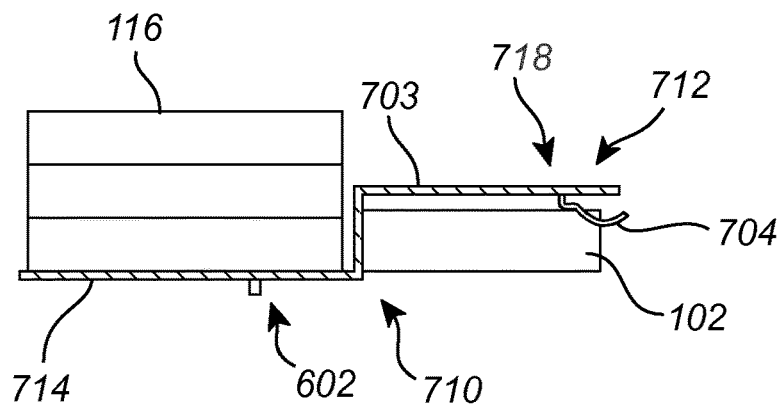
FIG. 14 conceptually illustrates a load sensing arrangement according to embodiments of the invention.

FIG. 13 and FIG. 14 conceptually illustrate further embodiment of the load sensing arrangement relating to various possible attachment elements.

In FIG. 13, there is conceptually shown a spring 116, a sensor holder 610, and a load sensor 102. The sensor holder 610 here comprises a mounting portion 614 with functionality as described with reference to the preceding drawings. The sensor holder 610 further comprises a sensor holding portion 612. In the embodiment shown in FIG. 8, the attachment element is provided in the form of a screw 606. The screw 606 is screwed and tightened through a threaded portion 607 (e.g. a nut) of the sensor holding portion 612. The sensor holding portion 612 further comprises a protective bracket 603. When the load sensor 102 is in place in the sensor holding portion 612 and the screw 606 is screwed into the threaded portion 607, the screw 606 applies a pressure on the load sensor 102 through a through-hole of the protective bracket 603. Thus, the screw 606 pushes the load sensor 102 onto the vehicle axle 106. The protective bracket 603 may be made from a plastic material or a metal, or a combination thereof. The protective bracket 603 is arranged to cover the load sensor 102 and to provide protection for the load sensor 102 from physical damage.

In FIG. 14, there is conceptually shown a spring 116, a sensor holder 710, and a load sensor 102. The sensor holder 710 here comprises a mounting portion 714 with functionality as described with reference to the preceding drawings. The sensor holder 710 further comprises a sensor holding portion 712. In the embodiment in FIG. 9, the attachment element is provided in the form of a resilient element such as a spring 704. The spring 704 is attached to a protective bracket 703 which covers the load sensor 102. Further, the spring 704 is adapted to apply a spring force to the load sensor 102 such that the load sensor 102 is pushed and held in place against the vehicle axle 106. With the resilient element, such as the spring 704, the load sensor 102 is conveniently mounted in the sensor holding portion 712 by pushing the load sensor 102 in under the protective bracket 704 such that the spring 704 is compressed to allow the load sensor 102 to enter the space between the protective bracket 703 and the vehicle axle 106.

Figure 15:
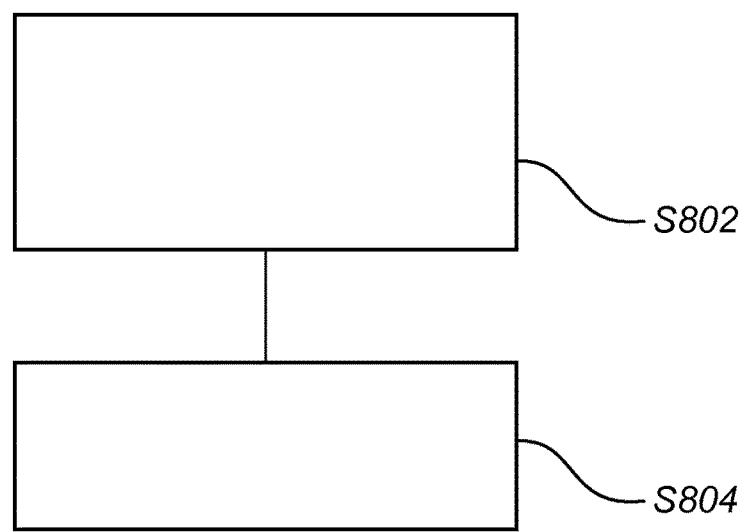
FIG. 15 is a flow-chart of method steps according to embodiments of the invention.

FIG. 15 is a flow chart of method steps according to embodiments of the invention. The method steps are for installing a non-invasive load sensor 102 on a vehicle axle 106. In a first step S802, a sensor holder 110 is arranged to the vehicle axle 106, such that the sensor holder 110 is arranged to hold the load sensor 102 in a position for direct measuring on the vehicle axle 106. In a second step S804, a sensor 102 is attached to the sensor holder 110 by releasable connection to the sensor holder 110.

In a variant of the method, the steps are for installing a load sensor on a vehicle axle adjacent to a spring suspension of a vehicle. In a first step, S802 a sensor holder is arranged between the vehicle axle and a spring of the spring suspension. As discussed with reference to the preceding drawings, the sensor holder comprises a sensor holding portion and a mounting portion. The mounting portion is held in place between the vehicle axle and the spring by a pressure applied from the spring (by for example U-bolts holding the spring in place against the vehicle axle) when mounted on the vehicle axle. The sensor holder portion is located outside the space between the vehicle axle and the leaf spring where the mounting portion is arranged. Subsequently, a load sensor is attached S804 on the sensor holder portion.

Alternatively or in addition to the above, a method may be provided wherein in a first step S802, a sensor holder 110 is arranged to the vehicle axle 106, such that the sensor holder 110 is arranged to hold the load sensor 102 in a position for direct measuring on the vehicle axle 106. In a second step S804, a sensor 102 is attached to the sensor holder 110 by automatic connection to the sensor holder 110.

Even though the invention has been described with reference to specific exemplifying embodiments thereof, many different alterations, modifications and the like will become apparent for those skilled in the art. Accordingly, it is to be understood that the present invention is not limited to the embodiments described above and illustrated in the drawings; rather, the skilled person will recognize that many changes and modifications may be made within the scope of the appended claims.

The invention claimed is:

1. A load sensor arrangement for installation on a vehicle axle of a vehicle, the load sensor arrangement comprising:
   a non-invasive load sensor for measuring a load subjected to the vehicle axle;
   a sensor holder comprising a sensor holding portion and a mounting portion; the
      mounting portion configured for arrangement to the vehicle axle; and
   an attachment element for releasable connection of the non-invasive load sensor to the sensor holding portion; wherein:
      the non-invasive load sensor comprises a magnetic sensor configured to measure a change in an inductive response from the vehicle axle by applying a magnetic field to the vehicle axle, or an optical sensor;
      the sensor holding portion is configured to hold the non-invasive load sensor in a position for direct measuring on the vehicle axle;
      the sensor holding portion comprises a protective bracket arranged to at least partly cover the non-invasive load sensor on a side of the non-invasive load sensor facing away from the vehicle axle; and
      the attachment element comprises a spring element extending from the protective bracket towards the non-invasive load sensor for applying a force on the non-invasive load sensor for maintaining the non-invasive load sensor in the position.

2. The load sensor arrangement of claim 1, wherein the sensor holding portion comprises at least one part of the attachment element.

3. The load sensor arrangement of claim 1, wherein the attachment element is adapted for automatic connection of the non-invasive load sensor to the sensor holding portion.

4. The load sensor arrangement of claim 1, wherein the mounting portion is adapted for non-invasive arrangement to the vehicle axle.

5. The load sensor arrangement of claim 4, wherein the mounting portion is adapted for the non-invasive arrangement to the vehicle axle by clamping or strapping.

6. The load sensor arrangement of claim 1 wherein the mounting portion is adapted for the arrangement to the vehicle axle by arrangement between the vehicle axle and a spring of a spring suspension system for the vehicle.

7. The load sensor arrangement of claim 1, wherein the mounting portion is adapted for the arrangement between springs connected to the vehicle axle.

8. A vehicle comprising an axle and a load sensor arrangement, the load sensor arrangement comprising:
   a non-invasive load sensor for measuring a load subjected to the vehicle axle;
   a sensor holder comprising a sensor holding portion and a mounting portion; the
      mounting portion configured for arrangement to the vehicle axle; and
   an attachment element for releasable connection of the load sensor to the sensor holding portion;
   wherein:
      the non-invasive load sensor comprises a magnetic sensor configured to measure a change in an inductive response from the vehicle axle by applying a magnetic field to the vehicle axle, or an optical sensor;
      the sensor holding portion is configured to hold the non-invasive load sensor in a position for direct measuring on the vehicle axle;
      the sensor holding portion comprises a protective bracket arranged to at least partly cover the non-invasive load sensor on a side of the non-invasive load sensor facing away from the vehicle axle; and
      the attachment element comprises a spring element extending from the protective bracket towards the non-invasive load sensor for applying a force on the non-invasive load sensor for maintaining the non-invasive load sensor in the position.

9. The vehicle of claim 8, further comprising springs connected to the vehicle axle, wherein the load sensor arrangement is arranged between the springs.

10. The vehicle of claim 9, wherein the load sensor arrangement is the only load sensor arrangement associated with the vehicle axle.

* * * * *